Oct. 17, 1950 L. G. MOLIQUE 2,525,821
INSULATION OF THERMAL VESSELS
Filed June 22, 1945
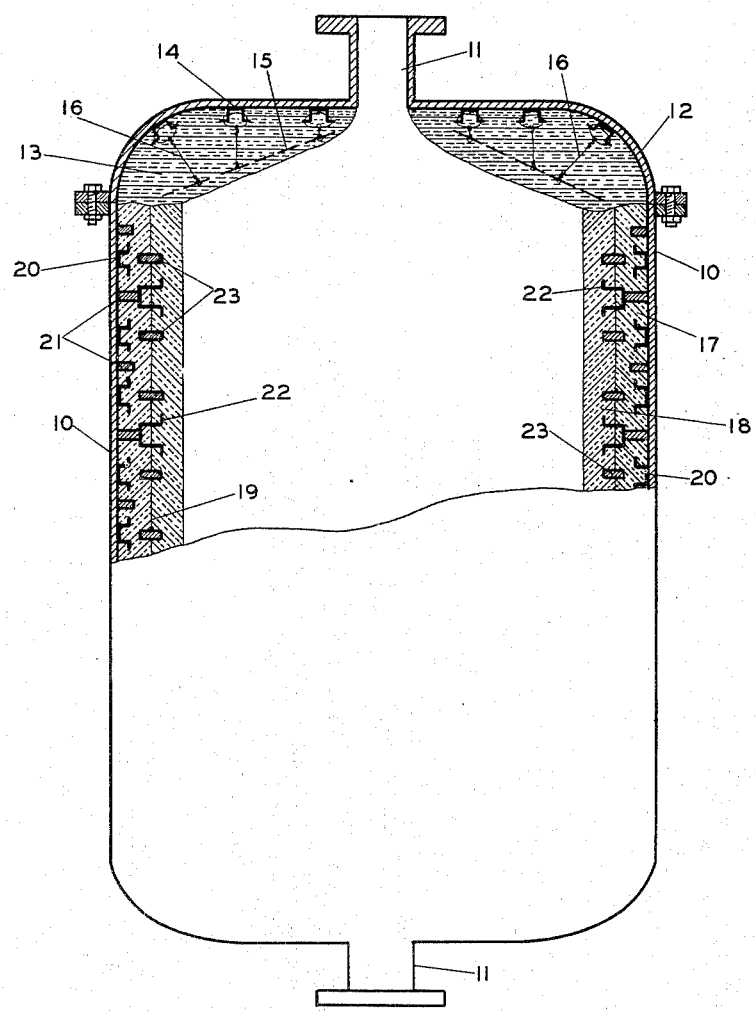
INVENTOR
L.G. MOLIQUE
BY Hudson & Young
ATTORNEYS Patented Oct. 17, 1950

2,525,821

UNITED STATES PATENT OFFICE 2,525,821

INSULATION OF THERMAL VESSELS

Lawrence G. Molique, Borger, Tex., assignor to Phillips Petroleum Company, a corporation of Delaware Application June 22, 1945, Serial No. 601,017

11 Claims. (Cl. 23—288)

This invention relates to thermally insulated containers and to a novel method of thermally insulating such containers. More particularly, the invention relates to the thermal insulation of chambers exposed to high temperatures and in which the insulating liner is subject to cracking, such as vessels utilized in hydrocarbon conversion processes, for example thermal or catalytic cracking.

Thermal insulation of vessels is conventionally obtained by applying an insulating cement or a resinous substance which solidifies and adheres to the surface of the vessel to be insulated, or by providing a preformed "liner" of similar or different material than the vessel to form an inner shell or outer casing. In using a metallic "liner," a space of varying depth, depending upon specific conditions, is established and may be filled with insulating material, if desired.

Such insulation is frequently used for the double purpose of minimizing heat losses and protecting the chamber walls of vessels employed in thermal conversion processes. In catalytic hydrocarbon conversions, for example, the catalyst becomes deactivated by a deposit of carbon and temperatures in the range of 1,000° F. to 1,500° F. are required to burn off the carbon and regenerate the catalyst. At such temperatures the chamber walls of the vessel deteriorate rapidly and consequently require the protection of heat-resisting insulation to prevent the walls from being subjected to temperatures approaching those employed in the catalyst regenerations. Also, in those conversion processes which involve endothermic reactions, the use of insulation to prevent heat losses is desirable in order to maintain an efficient rate of conversion. Thus it has become desirable and convenient to insulate the interior of the usual metal chamber with an insulating material, preferably of the refractory type. With such material it has become possible to use chambers of relatively inexpensive materials, such as carbon steel, instead of more expensive special metal alloys and still avoid the detrimental effects of high temperature. Furthermore, the insulation retards heat losses during conversion.

A common source of trouble, however, in the use of internally insulated chambers is the cracking of the insulation and channeling of fluids therethrough. This undesirable cracking may be caused by unequal heating and/or cooling during operation and is particularly likely to occur in regions around points of attachment of various pieces of structure, such as at connections fastening supports for screens in the case of catalyst beds or in other areas where a continuous solid surface of insulation is interrupted or disturbed. The tendency to crack and channel is especially prevalent in insulated catalyst chambers containing a bed or beds of catalyst since the catalyst presents a hinderance to the flow of fluid which may seek a path of less resistance through cracks which by-pass the catalyst bed. Such an eventuality results in unsatisfactory operation, heat losses through the chamber, and incomplete conversion of the process material. The development of these cracks in a chamber liner may permit "hot spots" to form on the chamber shell, especially during regeneration, with the consequent deterioration of the shell. Where a crack is formed it may be widened and lengthened and the insulation loosened from the walls of the chamber by fluids passing through the cracks and between the chamber wall and the insulation or by the contraction and expansion incident to heating and cooling of the chamber, such as may occur between regeneration and conversion steps in catalytic hydrocarbon conversion processes or between reaction and shutdown periods for the chamber. Due to the usual difference in coefficients of expansion between the metallic shell of the vessel and the insulating liner, the tendency of the insulation to become loosened from the chamber wall is increased, even though the shell may not become as hot as the insulation.

The formation of fluid-tight insulation liners is further complicated by the tendency of the insulating materials, such as refractory cements, to shrink on setting after being cast in the form of a plastic mass. With preformed refractory blocks or sections cemented at the joints, crumbling of the refractory cement used, and rupture of the joint seal frequently occurs due to the strain caused by unequal heating and cooling and the difference in coefficients of expansion between the sealing cement and the block or refractory section and further due to the above-mentioned tendency of refractory cements to shrink. Experience has shown that with present-day methods of insulation and insulating materials the insulation tends to crack and permit undesirable escape of fluids from the conversion zone. In particular, when conducting reactions utilizing solid catalytic material disposed in the catalyst chamber in the form of beds or otherwise, a substantial pressure drop exists between fluid inlet and outlet, and flow through cracks in the insulating liner, and then between the liner and the shell, may occur since this would represent a path of least resistance. Even where there is no substantial resistance to flow in the chamber, after long periods of operation and the successive fluctuations in temperature which occur in reaction and regeneration cycles etc., formation of cracks and separation of lining from the shell, may cause by-passing of portions of the catalyst mass by portions of the material being reacted. The present invention is, therefore, particularly applicable to the catalytic cracking of hydrocarbons, as for example, cracking of gas oils or naphthas at temperatures of 850–1150° F. over catalysts such as bauxite, silica-alumina, or acid-treated clay catalysts.

Various attempts to prevent the formation and/or compensate for the presence of undesirable cracks in the insulation protecting metallic vessel walls have been proposed. Thus, numerous substances and combinations of materials have been prepared for insulating materials and various methods of installing and arranging such insulations have been described. Diatomaceous earths, magnesia, firebrick, silicates, vermiculite, asbestos, ganister, etc., either alone, in combination or mixed with a binding material such as refractory cements are used in insulating vessels. The most common method of installing the insulation is to apply the material to the vessel wall in a single monolithic or sectional layer of a desired thickness. Other methods provide a space between the vessel wall and the insulation for the passage of a non-corrosive fluid or gas which may be one of the reactants. However, as discussed above, due to failure and cracking of the insulation and channeling of the vapors, or the necessity of additional equipment and operations, the present methods of insulating thermal vessels have not been entirely satisfactory.

Applicant has now discovered that by applying the internal insulation or lining in the form of a plurality of separate and distinct layers, the foregoing difficulties with respect to channeling and separation of lining and gas flow between lining and shell may be avoided or minimized. Thus cracks which form in one layer of the insulating material will extend only through that layer and will stop at the boundary of the adjacent layer. Since the cracks that form are in this way prevented from becoming continuous through the insulation to the metal shell, the disadvantages encountered heretofore are obviated. By the provision of a plurality of layers the durability and effectiveness of the insulation may be appreciably increased. If desired, the beneficial effects of this construction may be enhanced by the provision of vapor stops between linings as well as between the shell and its adjacent lining.

It is, therefore, an object of this invention to describe a novel method of insulating thermal vessels.

Another object is to describe a method of insulating a chamber whereby the deleterious effects occurring from cracks and channeling in internal insulating linings are substantially eliminated.

Still another object is to provide an internally insulated vessel for use in thermal reactions having incorporated therein several novel features which enhance the performance of the vessel.

A further object is to provide a thermally insulated vessel in which the insulating material is applied in a plurality of interior layers to minimize the effects of cracking and channeling.

Other objects will be apparent from the following disclosure and accompanying drawing.

In one embodiment of the present invention, suitable hard-setting plastic insulating material is applied in a monolithic layer throughout the interior of a catalyst chamber, allowed substantially to dry in situ and a second layer of refractory material applied throughout. With such an arrangement any cracks which may form in the inner layer will be stopped at the division of the layers and will not extend through the outer layer to the shell wall of the chamber. Stresses and strains and the extensive expansions and contractions induced by the relatively wide variations to which the innermost surface of the internal insulation is subjected will not be transmitted to the first or outer internal layer which, because of the second or intervening refractory layer, does not experience such drastic thermal conditions. Annular vapor stop plates are distributed throughout the body of the insulation and are continuously secured to the shell wall and embedded in the insulation to obstruct any escaping vapor and to strengthen the insulation. Wire cleats are distributed irregularly along the chamber wall and along the inner perimeter of the vapor stop plates to furnish additional reinforcement to the insulation. The second or inner layer of insulation, in addition to the support furnished by some of the cleats is further reinforced by retaining plates which are common to and extend into each layer of insulation. In order to ensure complete non-coherence of the two layers, it is preferable to apply a thin layer of a cement or other powdered material in the form of a slurry to the first layer prior to applying the second insulating layer.

The application of the invention may be described in connection with the insulation of a vessel as shown in the appended drawing which is an elevational view of a catalyst chamber in partial cross-section embodying the improvements of this invention.

In the drawing the numeral 10 represents a thermal chamber having inlet and outlet openings 11 and a cover 12 which is lined on the interior with a refractory insulating material 13 reinforced by steel alloy cleats 14 and wire mesh 15 suspended by steel-alloy tie wires 16. The body of the chamber is lined with a primary layer 17 and a secondary layer 18 of insulation. The first layer is applied to the shell wall by casting or guniting, that is, spraying a dispersion of the insulation from a gun, to a desired thickness which may be four or five inches in a chamber having a diameter of 8 to 12 feet or more. This is allowed to set before the application of the second layer. Preferably a thin brush coat 19 of a slurry of refractory cement is applied to the first layer before the application of the second layer to insure a separation and prevent a possible fusion of the two layers. The first layer is reinforced by cleats 20 similar to those described as being used in the chamber cover. These cleats may be bent alloy wire and are welded to the shell wall at irregular intervals. The insulation is further reinforced by annular vapor stops 21 continuously secured to the shell wall and embedded in the insulation. These vapor stops are annular steel alloy plates 2½ to 3½ inches wide and are spaced 6 to 12 inches apart throughout the length of the chamber. In addition to reinforcing the insulation, they are useful in arresting and preventing the flow of any vapors that may channel between the shell wall and the outer layer of insulation.

Additional cleats 22 are welded to some of the vapor stops 21 and extend beyond the surface of the first layer to furnish support for second layer. Steel anchor plates 23 are inserted into the first layer before it sets and extend into the second layer to furnish additional support and serve as vapor stops and deflectors. The second layer may be applied to the desired thickness by means similar to the application of the first layer and may be of the same or different material from that used in the first layer. It has been found beneficial to employ a slightly denser refractory material for the inner layer which, although it may not be quite as efficient as a heat insulator, will be less adsorptive for the vapor with which it is in contact. A satisfactory installation has been made using a refractory insulating material, composed of a fire clay-cement mixture and sold under trade name of Insulcrete, for the primary or outer layer of insulation and a mixture of the same material with from 5 to 50 weight per cent of dry sodium silicate for the second or inner layer. Water may be added in quantity sufficient to form a dispersion of suitable consistency for application. The effect of the sodium silicate in the second composition is to reduce the porosity of the insulating material on setting which thereby reduces the insulating properties to some extent and the gas adsorption properties to a large extent.

If desired, heated gases may be caused to flow over each layer of insulation after installation and over a brush coat of refractory cement between the layers of insulation to reduce setting time and speed up the total time required to complete the installation. Although the preceding discussion has incorporated the step of inserting a thin layer of cement between the layers of insulation as the preferred manner of installation, it may be omitted and the layers installed immediately adjacent or slightly apart. If desired, the insulation may be disposed advantageously in three or more concentric layers with an overall thickness of about 8 to 10 inches or more. Furthermore, the first or outer layer may or may not be installed immediately adjacent the shell wall.

Although the description has been confined to the installation of a monolithic lining, the invention is equally applicable to other forms of linings, such as precast molded sections, fire brick, and similar forms of chamber insulation. The method herein described is particularly beneficial where precast sections of insulation or insulating blocks are used. Failure of this type lining at the cemented joints is a common source of trouble. This failure permits the vapors to channel behind the sections of insulation and, with only one layer of refractory material, exposes the chamber shell wall to the deleterious conditions which prevail in the chamber. Employing two or more concentric linings as disclosed by this invention substantially eliminates the difficulty. By staggering the sections so that joints will not coincide with each other, further protection from hot vapors reaching the shell wall may be realized. These same advantages may be realized by following the same procedure when insulating with refractory brickwork.

Suitable material for the insulation includes, besides that already disclosed, various fire clays, diatomaceous earths, magnesite, concrete, mixtures of metallic oxides and cement, diatomaceous earths and cement, or other refractory clays and cellular mixtures, fire bricks, refractory blocks, concrete blocks or other preformed insulating blocks. Plastic, hard-setting substances are generally preferred, however, and may be applied as a water-slurry which is pressure sprayed or troweled into place and allowed to dry slowly in situ.

The layers of insulation mutually reinforce each other in addition to the support furnished by the cleats, vapor stop plates, and anchor plates. The disposition of the insulation in two or more layers insures better protection for the shell wall of the chamber than a single layer of insulation of equal or somewhat greater thickness. Furthermore, employing hard-setting material in each layer is advantageous in furnishing the additional mutual support described and in permitting the effective use of anchor plates jointly embedded in adjacent layers which supply still further anchorage and support of the walls of insulation.

The practice of the invention, while generally applicable to all internally insulated vessels, is particularly applicable to catalyst chambers lined with refractory catalytic material. As discussed above, these chambers operate under extremes of thermal conditions and thus the lining is particularly subject to cracking and channeling with loss of effectiveness. Insulating these chambers as disclosed by the invention effectively minimizes the difficulties occurring heretofore with the insulation as currently practiced.

Various modifications and minor rearrangements may be made without departing from the spirit of the invention and the examples described are to be interpreted as illustrative only.

I claim:

1. A process for the internal insulation of vessels which comprises applying insulation in at least one distinct layer, applying to said insulation an inner layer of substantially denser nonporous heat refractory material which is unannexed to the immediate preceding layer of insulation and which is substantially non-adsorptive, and arranging metallic retaining plates embedded in and common to two successive layers of insulation.

2. A process for the internal insulation of vessels which comprises disposing a first layer of insulation within said vessel, allowing said insulation to set substantially, covering said insulation with a relatively thin layer of refractory cement, applying a layer of substantially non-porous, denser heat-resistant insulating material which is substantially non-adsorptive, and arranging metallic retaining plates common to and embedded in adjacent successive layers of said insulating lining.

3. An internally insulated vessel having a metallic outer shell, openings for introducing and removing fluids, at least two distinct concentric layers of insulation adjacent the inner wall of said shell, and a plurality of unattached metallic retaining plates embedded at spaced points in, and common to, two contiguous successive layers of said insulation to furnish mutual support for said contiguous layers and prevent vapor flow therebetween.

4. An internally insulated vessel having an outer metallic wall, openings for introducing and removing fluids, annular metallic plates continuously secured to the inner shell wall and embedded in an adjacent insulating layer, at least two distinct concentric layers of insulation adjacent the inner shell wall and unattached metallic retaining plates embedded at spaced points in, and common to, two contiguous successive layers of said insulation to furnish mutual support for said contiguous layers and prevent vapor flow therebetween.

5. A vessel according to claim 4 in which retainer cleats comprising bent alloy wire are attached to at least certain of said annular plates in a manner such that the cleats extend beyond the surface of said first layer of insulation and into a succeeding layer to furnish support therefor.

6. The vessel of claim 4 in which the innermost concentric layer is substantially non-porous and non-adsorptive for vapors in contact therewith.

7. An internally insulated vessel for confinement and passage of fluids under pressure which comprises in combination an outer metal shell, inlet and outlet openings for introducing and removing said fluid, spaced annular metallic plates hermetically sealed to the inner wall of said shell, a first annular layer of insulation disposed adjacent to said shell with said annular plates extending a substantial distance into the interior of said first layer, a distinct second layer of insulation disposed adjacent to said first layer, spaced metal plates embedded in said layers and extending commonly through contiguous surfaces into said layers, supporting means secured to the inner wall of said shell for reenforcing said first layer comprising bent alloy wires anchored to said shell wall and extending into said first layer, and supporting means secured to said shell wall for reenforcing said second layer comprising bent alloy wires anchored to said shell and extending into said second layer, whereby cracks in one layer are prevented from continuing into another layer and continuously throughout the insulation to the shell wall and whereby the flow of fluid between said layers and directly along said shell wall is substantially eliminated.

8. An internally insulated vessel for confinement and passage of fluids which comprises in combination an outer metal shell, inlet and outlet openings for introducing and removing said fluid, spaced annular metallic plates hermetically sealed to the inner wall of said shell, a first annular layer of insulation disposed adjacent to said shell with said annular plates extending a substantial distance into the interior of said first layer, at least one additional layer of insulation disposed adjacent to said first layer, spaced unattached metal retaining plates embedded in adjoining successive layers and extending commonly through contiguous surfaces into said layers, supporting means secured to the inner wall of said shell for reenforcing said first layer comprising alloy cleats anchored to said shell, and supporting means secured to said shell wall for reenforcing a second layer comprising alloy cleats anchored to said shell, whereby cracks in one layer are prevented from continuing into another layer and continuously throughout the insulation to the shell wall and whereby the flow of fluid between said layers and directly along said shell wall is substantially eliminated.

9. An internally insulated vessel for confinement and passage of fluids which comprises in combination an outer metal shell, inlet and outlet openings for introducing and removing said fluid, spaced annular metallic plates hermetically sealed to the inner wall of said shell, a first annular layer of insulation disposed adjacent to said shell with said annular plates extending a substantial distance into the interior of said first layer, a distinct second layer of insulation disposed adjacent to said first layer, and spaced unattached metal retaining plates embedded in said layers and extending commonly through contiguous adjoining surfaces into said layers, whereby cracks in one layer are prevented from continuing into another layer and continuously throughout the insulation to the shell wall and whereby the flow of fluid between said layers and directly along said shell wall is substantially eliminated.

10. An internally insulated vessel for intermittent confinement and passage of fluids under pressure which comprises in combination an outer metal shell, inlet and outlet openings for introducing and removing said fluid, spaced annular metallic plates hermetically sealed to the inner wall of said shell, a first annular layer of insulation disposed adjacent to said shell with said annular plates extending a substantial distance into the interior of said first layer, at least one additional distinct annular layer of insulation disposed coextensively and contiguously with a preceding layer, and unattached metal retaining plates embedded in said layers and extending commonly through two contiguous surfaces into the interior of two immediately adjacent layers, whereby cracks in one layer are prevented from continuing into another layer and continuously throughout the insulation to the shell wall and whereby the flow of fluid between said layers and directly along said shell wall is substantially eliminated.

11. An internally insulated vessel for intermittent confinement and passage of fluids under pressure which comprises in combination an outer metal shell, inlet and outlet openings for introducing and removing said fluid, spaced annular metallic plates hermetically sealed to the inner wall of said shell, a first annular layer of insulation disposed adjacent to said shell with said anular plates extending a substantial distance into the interior of said first layer, at least one additional annular layer of insulation disposed coextensively and contiguously with a preceding layer, the innermost layer of which is more dense and less adsorptive than the preceding layers of insulation, and unattached metal retaining plates embedded in said layers and extending commonly through two contiguous surfaces into the interior of two immediately adjacent layers, whereby cracks in one layer are prevented from continuing into another layer and continuously throughout the insulation to the shell wall and whereby the flow of fluid between said layers and directly along said shell wall is substantially eliminated.

LAWRENCE G. MOLIQUE.

REFERENCES CITED

The following references are of record in the file of this patent:

UNITED STATES PATENTS

| Number | Name | Date |
|---|---|---|
| 1,924,832 | Brandt | Aug. 29, 1933 |
| 1,948,391 | Montgomery et al. | Feb. 20, 1934 |
| 2,355,753 | Roberts, Jr. | Aug. 15, 1944 |